United States Patent Office 3,408,338
Patented Oct. 29, 1968

3,408,338
POLYMERS OF ACRYLONITRILE WITH
OLEFINICALLY UNSATURATED UREA
Jeno Szita, Dormagen, Ulrich Bahr, Opladen, and Herbert Marzolph and Gunther Nischk, Dormagen, Germany, assignors to Farbenfabriken Bayer Aktiengesellschaft, Leverkusen, Germany, a corporation of Germany
No Drawing. Filed June 29, 1965, Ser. No. 468,096
Claims priority, application Germany, July 15, 1964,
F 43,441
15 Claims. (Cl. 260—79.3)

ABSTRACT OF THE DISCLOSURE

A novel class of acrylonitrile copolymers and process of preparing the same. The copolymer comprising acrylonitrile and a polymerizable olefinically unsaturated urea compound of the formula:

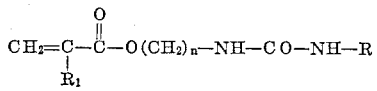

wherein R is an N-heteroaromatic radical, $n$ represents an integer of from 2 to 4, and $R_1$ is hydrogen or alkyl. The copolymers are prepared by copolymerizing acrylonitrile and said olefinically unsaturated urea compound in an aqueous medium at a pH of from 3 to 5 and a temperature of 10 to 70° C. in the presence of a Redox catalyst system.

---

This invention relates to a new class of copolymers of acrylonitrile and to a process for the production of acrylonitrile copolymers with improved properties.

It is known that acrylonitrile can be polymerized in aqueous media at acidic pH-values, either by itself or in admixture with other polymerizable monomers, with the aid of Redox catalyst systems. The resulting polymers may be molded by known processes to form filaments and films. Unfortunately, the affinity of such products for the conventional dyes is not high enough to lead to practically useful and dark shades. The reason for this lies in the absence of, or in a deficiency of, dye-receptive groups in the polymer. For this reason, attempts have frequently been made to render the polymer receptive to basic (cationic) or acidic (anionic) dyes by copolymerizing it with compounds containing acidic or basic groups, for example, styrene sulphonic acid or vinyl pyridine. Due, however, to the sensitivity of acrylic polymers to basic compounds which is shown by a marked tendency towards yellowing under the influence of heat, severe restrictions are imposed on the type and quantity of basic comonomers used. Where basic co-components, containing secondary or tertiary amino groups, are used, further difficulties arise during polymerization if, as is usually the case, a Redox system containing peroxide compounds, or if these compounds alone, are used as the initiators. This is due to the fact that the aforementioned co-components participate in the initiating and terminating reaction, with the result that the polymerization velocity and the molecular weight of the resulting polymer are very considerably reduced. Such polymers contain basic terminal groups which further increase the already mentioned tendency towards yellowing. Polymerization is also greatly affected by the presence of oxygen, so that polymerization does not usually take place at all in the presence of air.

It is, therefore, an object of this invention to provide a copolymer comprised of at least 80 percent by weight of acrylonitrile and an olefinically unsaturated basic urea compound of the formula

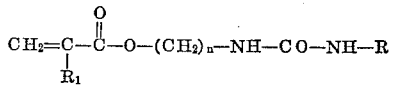

wherein R represents an N-heteroaromatic radical, $n$ represents an integer from 2 to 4 and $R_1$ represents hydrogen or alkyl, optionally together with other monomers. R may, for example, represent a simple or substituted radical of pyridine, quinoline or s-triazine.

A further object is to provide a process for preparing acrylonitrile copolymers which exhibit a high affinity both for acidic dyes and for basic dyes. This process comprises copolymerizing acrylonitrile and olefinically unsaturated basic urea derivatives of the formula

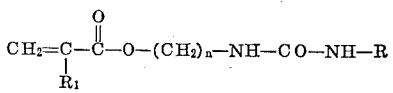

wherein R represents an N-heteroaromatic radical, $n$ represents an integer from 2 to 4 and $R_1$ represents hydrogen or alkyl, optionally together with other monomers. R may, for example, represent a simple or substituted radical of pyridine, quinoline or s-triazine.

One particular advantage of this process is that acrylonitrile copolymers can be obtained which have a high basic co-component content and exhibit a correspondingly high affinity for acidic dyes and a surprisingly high degree of whiteness, and remain stable under thermal and oxidizing influences. In addition, polymerization is not detrimentally affected by the addition of the basic co-components according to the invention, with the result that high polymerization velocities and yields are obtained.

The aforementioned olefinically unsaturated basic urea derivatives may be obtained from an acrylic or methacrylic ester isocyanate by reaction with the corresponding amino-N-hetero aromatic compound, for example, α-amino-pyridine.

The following compounds may, for example, be used as the olefinically unsaturated urea derivatives:

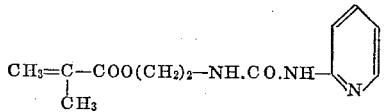

I

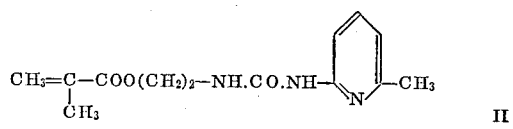

II

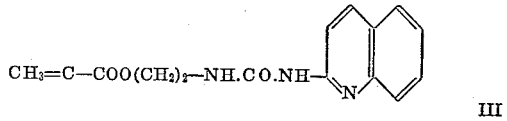

III

The co-monomers may also be used in the form of their salts or as quaternary ammonium compounds, for example:

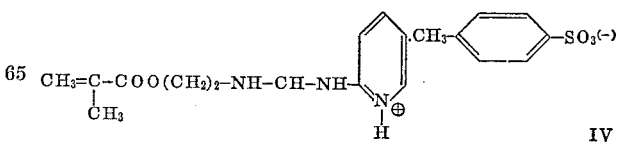

IV

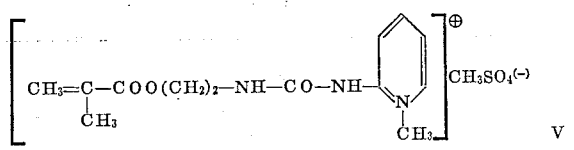

The basic urea content of the acrylonitrile copolymer may be varied within wide limits. Quantities from 0.1 to 20% by weight, based on the total amount of monomer, are preferred.

The greater part and at least 80% by weight of the polymers according to the invention are intended to consist of acrylonitrile. In addition, however, to the unsaturated basic ureas, other copolymerizable monomers may be used, for example, acrylates and methacrylates, vinyl acetate, vinyl chloride, vinylidene chloride, styrene, acrylic amide and styrene sulphonic acid.

These copolymers contain preferably 0.1 to 19.9% by weight of said ethylenically unsaturated monomer and 0.1 to 19.9% by weight of said urea monomer.

In general, the polymer preferably contains 200 to 500 milliequivalents of basic groups/kg. of polymer. In special instances, however, this quantity may be very considerably increased.

When polymerization is carried out, the affinity of the polymers for dyes may also be varied in accordance with the nature and quantity of the catalysts used. The terminal sulphate or sulphonic acid groups incorporated during the formation of the macromolecules are known to possess an affinity for catonic dyes. The terminal group content is therefore variable with the polymolecularity of the polymers and their K-value. In cases where catalysts yielding the aforementioned terminal acidic groups are used, for example a Redox system consisting of persulphate/bisulphite, a wider range of possibilities for modifying the affinity of the polymers for basic dyes is obtained. Since no basic terminal groups are formed during the copolymerization of the basic co-components according to the invention, there also remains an affinity for basic dyes dependent upon the number of terminal acid groups (up to 60 milliequivalents of acid groups/kg. of polymer). In this case, polymerization is carried out in the usual way. Water, added in a quantity five to ten times larger than that of the monomers, is used as the polymerization medium. Polymerization is carried out at temperatures in the range from 10 to 70° C., preferably from 40 to 60° C. The pH-value of the polymerization medium is from 3 to 5, preferably from 4 to 4.5. It is adjusted to the required value with strong inorganic acids, such as sulphuric acid or phosphoric acid. Mixtures of different acids as well as strong organic acids, for example aryl sulphonic acids, may also sometimes be used to advantage.

Compounds which can form free radicals are suitable for use as polymerization catalysts. Examples of such compounds include hydrogen peroxide, persulphates and hydroperoxides. Redox systems are generally preferred, particularly those based upon per compounds and compounds of sulphur in a low oxidation stage. Suitable per compounds are the alkali metal and ammonium salts of persulphuric acid and perphosphoric acid, or hydrogen peroxide. Suitable compounds of sulphur in low oxidation stages include the alkali metal salts or ammonium salts of pyrosulphurous acid or of thiosulphuric acid. The per compounds are used in quantities from 0.3 to 3% by weight, based on the polymerizable monomers, and the reducing agents in quantities from 0.3 to 6% by weight. In many instances, heavy metal compounds, used in small quantities, have proved to be effective accelerators.

In addition to the salts used as Redox catalysts, suitable neutral salts, such as alkali metal sulphates and phosphates, may be present in the polymerization mixture. If desired, polymerization regulators such as aliphatic mercaptans, optionally those containing a hydroxyl group near the sulphydryl group, for example thioglycol, may also be used in the process according to the invention.

The copolymerization of unsaturated basic ureas with acrylonitrile, and optionally with other vinyl compounds, may be carried out continuously or batchwise. In this way, it is possible, by modifying the polymolecularity of the copolymer, to vary the number of dye-receptive terminal groups and hence the affinity for basic dyes within wide limits. Providing suitable catalysts are used, copolymerization proceeds smoothly and high yields of polymers with the relatively high molecular weights required for the production of fibers are obtained after short reaction times. The copolymers accumulating in fine-grained form may satisfactorily be further processed (e.g. filtration and drying). They are readily soluble in the conventional solvents for acrylic polymers such as dimethyl formamide, dimethyl acetamide, dimethyl sulphoxide and butyrolactone, and spinning solutions with a high polymer concentration may be prepared.

The moldings, foils, films, filaments and fibres prepared from the copolymers according to the invention may be readily dyed deep shades both with basic and with acidic and dispersion dyes, and remain resistant both to sunlight and washing. In addition, fibres prepared from the copolymers according to the invention exhibit a light natural color so that additional bleaching is often unnecessary. Further particularly valuable properties of such fibres are their high thermostability and resistance to other discoloring influences, such as the action of alkalis and oxygen. Even with a relatively high urea content, fibres and filaments prepared from the copolymers according to the invention exhibit outstanding physical properties.

Unless otherwise indicated, the parts and percentages used in the following examples, which are merely illustrative represent parts by weight and percentages by weight, respectively, base on the total amount of monomer.

EXAMPLE 1

900 parts of demineralized water are acidified to pH 4.5 with toluene sulphonic acid, poured into a suitable reaction vessel from which the air is displaced by nitrogen and heated to 55° C. 3.7 parts of an unsaturated basic urea having the formula

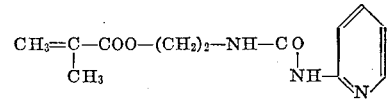

and 70 parts of acrylonitrile are then added and the mixture is stirred until a solution is obtained. This is then mixed with 0.35 part of potassium persulphate and 1.05 parts of sodium pyrosulphite. The mixture becomes turbid after 20 to 30 seconds, showing that polymerization has started. The reaction mixture is stirred for four hours at 50° C. under a protective nitrogen pressure (5 to 10 mm. Hg). The precipitated, fine-grained polymer is isolated by filtration, washed free from acid with demineralized water and dried in vacuo at 60 to 70° C. The resulting copolymer has a K-value of 87.2 (according to Fikentscher, Cellulose-chemie, 13, p. 58 (1932)); yield 83% by weight.

Further copolymerization tests were carried out with other compounds in various proportions with acrylonitrile. The modified reaction conditions and the results are given in Table 1.

TABLE 1

| Test No. | Name | Co-component amount, percent | Catalyst system, percent | | pH | Conversion, percent | K-value |
|---|---|---|---|---|---|---|---|
| | | | $K_2S_2O_8$ | $Na_2S_2O_5$ | | | |
| 1 | I | 5.0 | 0.50 | 1.50 | 4.5 | 83 | 87.2 |
| 2 | I | 6.5 | 0.45 | 1.35 | 4.5 | 77 | 84.4 |
| 3 | I | 8.0 | 0.40 | 1.20 | 4.5-5 | 73 | 83.7 |
| 4 | I AME | 6.5 4.5 | 0.50 | 1.00 | 4.5 | 82 | 86.5 |
| 5 | I AME | 8.0 4.0 | 0.50 | 1.00 | 4.5-5 | 79 | 83.3 |
| 6 | II | 5.0 | 0.60 | 1.20 | 4 | 80 | 81.2 |
| 7 | II AME | 8.0 4.0 | 5.50 | 1.10 | 4-4.5 | 78 | 82.9 |
| 8 | IV AME | 8.0 4.0 | 0.50 | 1.00 | ² 4.5 | 79 | 80.5 |
| 9 | V AME | 8.0 4.0 | 0.45 | 0.45 | 4.5 | 71 | 79.8 |
| 10 | 4-VP | 5.0 | 0.45 | 0.90 | 4-4.5 | 36 | 81.3 |
| 11 | | | 0.80 | 2.40 | 4 | 81 | 84.5 |
| 12 | AME | 5.0 | 0.85 | 2.55 | 4 | 85 | 66.3 |

¹ Abbreviations: I to V = the formulae of the co-components as given in columns 2 and 3; AME = methyl acrylate; 4-VP = 4-vinyl pyridine.
² Without addition of acid.
³ Comparison tests.

EXAMPLE 2

In order to measure the extent to which the polymers are discolored in a dimethyl formamide solution at relatively high temperatures, the following tests were carried out: 5% solutions were tempered at 80° C. in the presence of air. Samples were taken after 2, 4 and 20 hours and the extinction coefficients were measured with an electrophotometer (Type Elko III, manufactured by Zeiss) at 450 mμ wave length. A 5 cm. cell and pure dimethyl formamide acting as the comparison solution were used for measurement. The measured values are given in Table 2:

TABLE 2

| Test No. | Extinction · 100 after— | | |
|---|---|---|---|
| | 2 hrs. | 4 hrs. | 20 hrs. |
| 1 | 14 | 22 | 81 |
| 2 | 26 | 40 | 69 |
| 3 | 29 | 42 | 66 |
| 4 | 25 | 39 | 70 |
| 5 | 31 | 44 | 77 |
| 6 | 40 | 50 | 82 |
| 7 | 32 | 48 | 68 |
| 8 | 16 | 27 | 60 |
| 9 | 39 | 48 | 90 |
| 10 | 257 | 269 | 283 |
| 11 | 42 | 67 | 97 |
| 12 | 38 | 61 | 88 |

EXAMPLE 3

The copolymers according to the invention prepared in accordance with Example 1 contain basic groups which may be precisely determined by potentiometric titration. Measurement is carried out as follows: 0.3 to 0.5 g. of copolymer are dispersed in 20 ml. of nitromethane, after which 2 ml. of 98% formic acid are added. Heating produces a clear solution which is then diluted with 50 ml. of cold nitromethane. Potentiometric titration is carried out with a 0.05 solution of $HClO_4$ in dioxane. It is followed by a blank run.

The measured values (milliequivalents of basic groups/ g. of polymer) are given in Table 3 below.

EXAMPLE 4

The following processes were used to form and dye the copolymers according to the invention:

The polymers were dissolved in dimethyl formamide (18% solutions) and films of equal thickness were cast from these solutions. After 18 hours' drying in a through-circulation drying cabinet at 50 to 60° C., the films were washed free from solvent with warm water and then dried.

The films thus prepared were dyed with an acid dye (Acilandirektblau A, Color Index, 2nd ed. No. 1264; vol. 1) and with a basic dye (Astrazonblau B, Color Index, 2nd ed., No. 42140; vol. III). Dyeing was carried out as follows:

(a) Basic:
    100 ml. of Astrazonblau B (1 g./l.),
    2 ml. of acetic acid,
    0.3 ml. of sodium acetate (40 g./l.).

The dye is dissolved in boiling water and is then filtered and measured out while hot. 1 g. of film is added at a dyeing bath temperature of 80° C. and is dyed for 1 hour after the boiling temperature has been reached.

(b) Acid:
    100 ml. of Acilandirektblau A (1 g./l.),
    0.8 ml. of sulphur acid (100 g./l.).

The dye does not have to be dissolved in boiling water. Dyeing was carried out as in (a).

The dyed films were washed thoroughly with water and dried.

In order quantitatively to determine the amount of dye absorbed, the dyed films were carefully dissolved in dimethyl formamide. Measurement was made with a spectral photometer and a calibration curve. The measurement results are given in Table 3 (g. dye/g. film).

TABLE 3

| Test No. | Meq. basic groups÷g. polymer · 100 | (G. dye/g. film) · 100 | |
|---|---|---|---|
| | | Acilandirektblau A (acid) | Astrazonblau B (basic) |
| 1 | 20 | 2.1 | 0.23 |
| 2 | 26 | 3.3 | 0.31 |
| 3 | 30 | 4.1 | 0.38 |
| 4 | 25 | 3.6 | 0.30 |
| 5 | 31 | 4.6 | 0.47 |
| 6 | 24 | 3.6 | 0.39 |
| 7 | 35 | 5.3 | 0.44 |
| 8 | 28 | 4.0 | 0.49 |
| 9 | | 2.4 | 0.12 |
| 10 | 63 | 9.2 | 0.05 |
| 11 | <0.05 | | 0.27 |
| 12 | <0.05 | | 0.46 |

EXAMPLE 5

Copolymers according to the invention are dissolved by stirring in dimethyl formamide at 70° C. After filtration, the 25 to 27% homogeneous solutions are spun in the usual way by the dry spinning process. The resulting filaments were then stretched in boiling water to 3.5 times their original length, dried in the stretched condition and tempered for 10 minutes at 120° C. The filaments had a thickness of 3 den.

In order to test the thermostability of the filaments, they were tempered in hot air for one hour at 160° C. They were discolored to a much smaller extent than filaments containing vinyl pyridine (see Table 4).

The dye-absorption tests were carried out as in Example 4. The results (quantities of dye absorbed) are given in Table 4.

TABLE 4

| Composition | | K-value | Natural colour | Discoloration at temperature of hot air | Dye-absorption, g. dye÷g. fibre·100 | |
|---|---|---|---|---|---|---|
| Monomer | Ratios by weight | | | | Acid | Basic |
| AN:AME:I | 91:4.5:4.5 | 79.5 | White | Pale, yellowish-brown shade. | 2.32 | 0.59 |
| AN:AME:I | 89:6.5:4.5 | 78.4 | ....do | ....do | 2.50 | 0.62 |
| AN:AME:I | 87:8.5:4.5 | 78.9 | ....do | ....do | 2.76 | 0.82 |
| AN:AME:I | 89:4.5:6.5 | 80.1 | ....do | ....do | 2.95 | 0.73 |
| AN:AME:I | 87:6.5:6.5 | 81.3 | ....do | ....do | 3.30 | 0.79 |
| AN:AME | 95:5 | 85.0 | ....do | ....do | <0.05 | 0.28 |
| AN:AME:V-VP | 91:4.5:4.5 | 82.5 | Yellowish | Brown | 6.20 | 0.08 |

What we claim is:

1. An acrylonitrile copolymer comprising at least 80% by weight of acrylonitrile and 0.1 to 20% by weight of a polymerizable olefinically unsaturated urea compound of the formula:

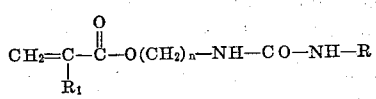

wherein R represents an N-heteroaromatic radical, which is attached to the urea nitrogen through a carbon atom of said N-heteroaromatic radical, $n$ represents an integer of from 2 to 4 and $R_1$ represents a member selected from the group consisting of hydrogen and methyl.

2. The copolymer of claim 1, wherein from about 0.1 to about 19.9% by weight of copolymerizable ethylenically unsaturated monomer and from about 0.1 to about 19.9% by weight of said urea monomer are present in copolymerized form in said copolymer.

3. The copolymer of claim 1 in the form of a filament.
4. The copolymer of claim 2 in the form of a filament.
5. The copolymer of claim 2, wherein said copolymerizable ethylenically unsaturated monomer is a member selected from the group consisting of acrylates, methacrylates, vinyl acetate, vinylchloride, vinylidene chloride, styrene, acrylic amide, and styrene sulfonic acid.
6. The copolymer of claim 2, wherein said ethylenically unsaturated monomer is methylacrylate.
7. The copolymer of claim 2, wherein said ethylenically unsaturated monomer is 4-vinyl pyridine.
8. An acrylonitrile copolymer according to claim 1 containing 200 to 500 milliequivalents of basic groups/kg. of polymer.
9. A process for the manufacture of an acrylonitrile copolymer containing at least 80% by weight of acrylonitrile which comprises copolymerizing acrylonitrile and 0.1 to 20% by weight of a polymerizable olefinically unsaturated urea compound of the formula:

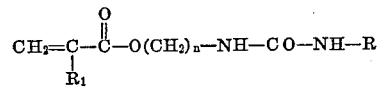

wherein R represents an N-heteroaromatic radical which is attached to the urea nitrogen through a carbon atom of said N-heteroaromatic radical, $n$ represents an integer of from 2 to 4 and $R_1$ represents a member selected from the group consisting of hydrogen and methyl in an aqueous medium at a pH value of from 3 to 5 and a temperature of 10 to 70° C. in the presence of a Redox catalyst system.

10. A process according to claim 9, which comprises effecting said copolymerizing at a temperature of from 40° to 60° C.
11. A process according to claim 9, which comprises effecting said polymerizing at a pH of from 4 to 4.5.
12. A process according to claim 9, which comprises effecting said copolymerizing in the presence of another copolymerizable monomer selected from the group consisting of acrylates, methacrylates, vinyl acetate, vinylchloride, vinylidene chloride, styrene, acrylic amide, and styrene sulfonic acid.
13. A process according to claim 9, which comprises effecting said copolymerizing in the additional presence of a neutral salt.
14. A process according to claim 9, wherein said unsaturated urea compound is a member selected from the group consisting of

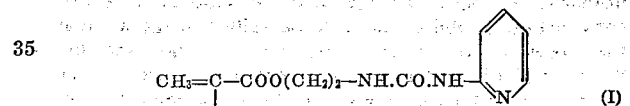

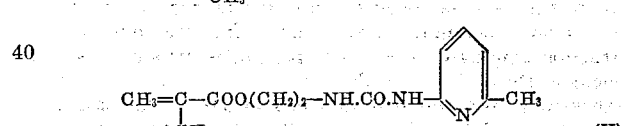

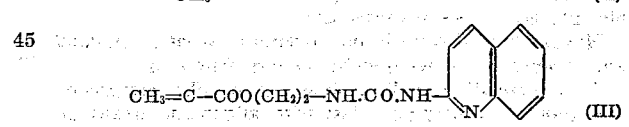

their salts and quaternary ammonium compounds.

15. A process according to claim 9, wherein said unsaturated basic urea is

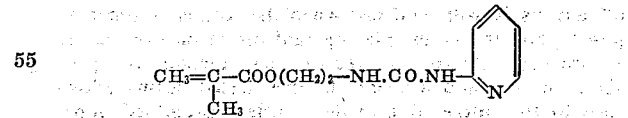

No references cited.

JOSEPH L. SCHOFER, *Primary Examiner.*
HARRY WONG, *Assistant Examiner.*

UNITED STATES PATENT OFFICE
CERTIFICATE OF CORRECTION

Patent No. 3,408,338                                October 29, 1968

Jeno Szita et al.

It is certified that error appears in the above identified patent and that said Letters Patent are hereby corrected as shown below:

Column 2, lines 63 to 67, the formula should appear as show below:

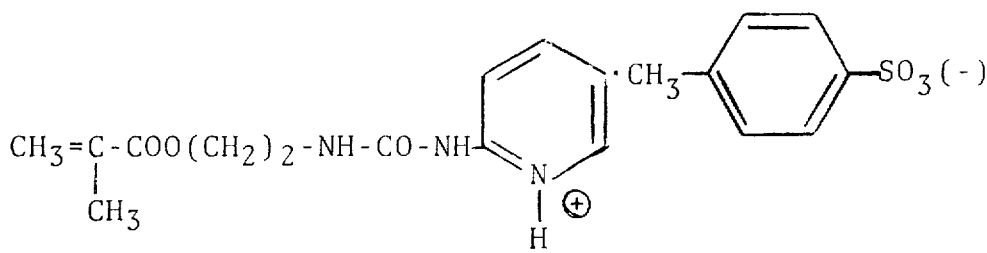

Column 3, line 33, "catonic" should read -- cationic --. Column 4, line 41, "base" should read -- based --. Columns 5 and 6, TABLE 1, in the heading to the second column, "Name" should read -- ¹Name --; same table, first column, lines 10 to 12 there of, insert footnote numeral "³", each occurrence; same table, eighth column, line 12 thereof, "66.3" should read -- 86.3 --. Column 6, TABLE 3, in the heading to the second column, "Meg. basic" should read -- Milliequiv. basic --. Column 7, TABLE 4, first column, line 8 thereof, "V-VP" should read -- 4-VP --.

Signed and sealed this 10th day of March 1970.

(SEAL)
Attest:

EDWARD M. FLETCHER, JR.                     WILLIAM E. SCHUYLER, JR.
Attesting Officer                              Commissioner of Patents